US010076716B2

(12) United States Patent
Clement et al.

(10) Patent No.: US 10,076,716 B2
(45) Date of Patent: Sep. 18, 2018

(54) PINNED FLY RING FOR ROTARY DRUM WASHER AND METHOD OF MANUFACTURE

(71) Applicants: Joel Kimmett Clement, Skowhegan, ME (US); Michael Alan Tardie, Lunenburg, MA (US); Frank John Merchel, III, Windham, NH (US)

(72) Inventors: Joel Kimmett Clement, Skowhegan, ME (US); Michael Alan Tardie, Lunenburg, MA (US); Frank John Merchel, III, Windham, NH (US)

(73) Assignee: GL&V USA Inc., Nashua, NH (US)

( * ) Notice: Subject to any disclaimer, the term of this patent is extended or adjusted under 35 U.S.C. 154(b) by 327 days.

(21) Appl. No.: 14/831,544

(22) Filed: Aug. 20, 2015

(65) Prior Publication Data

US 2016/0051914 A1    Feb. 25, 2016

Related U.S. Application Data

(60) Provisional application No. 62/040,788, filed on Aug. 22, 2014.

(51) Int. Cl.
| | |
|---|---|
| *B01D 33/06* | (2006.01) |
| *B01D 33/067* | (2006.01) |
| *B01D 33/073* | (2006.01) |
| *B01D 33/46* | (2006.01) |

(52) U.S. Cl.
CPC ......... *B01D 33/067* (2013.01); *B01D 33/073* (2013.01); *B01D 33/466* (2013.01)

(58) Field of Classification Search
CPC . F16B 5/00; F16B 5/02; B01D 33/067; B01D 33/06; B01D 33/073; D21D 1/40
See application file for complete search history.

(56) References Cited

U.S. PATENT DOCUMENTS

| | | | | |
|---|---|---|---|---|
| 1,111,275 A | * | 9/1914 | Spence | B01D 33/06 210/395 |
| 1,923,138 A | * | 8/1933 | Boynton | B01D 33/073 210/392 |
| 2,724,507 A | * | 11/1955 | Cataldo | B01D 33/067 210/236 |
| 3,318,099 A | * | 5/1967 | Sugden | E21D 11/18 403/108 |
| 4,038,187 A | * | 7/1977 | Saffran | B01D 33/067 210/108 |

(Continued)

FOREIGN PATENT DOCUMENTS

| | | | | |
|---|---|---|---|---|
| EP | 2511539 A1 | * | 10/2012 | ............. F16B 19/02 |
| GB | 291148 A | * | 5/1928 | ........... B01D 33/067 |
| GB | 2143000 A | * | 1/1985 | ......... B62D 25/2063 |

*Primary Examiner* — Jonathan P Masinick
(74) *Attorney, Agent, or Firm* — James Earl Lowe, Jr.

(57) ABSTRACT

Disclosed is a fly ring adapted to be used in a rotary drum filtering apparatus, and a method of forming such a fly ring. The fly ring comprises a plurality of ring segments, each ring segment being laser cut. Each ring segment has a first end which overlaps a second end of an adjacent ring segment, forming a lapped joint. Each ring segment first and second end has at least two spaced apart through holes, the through holes of the first end being aligned with the through holes of the second end. A custom fastener extends through the first end and second end aligned through holes.

6 Claims, 6 Drawing Sheets

(56) References Cited

U.S. PATENT DOCUMENTS

| | | | | |
|---|---|---|---|---|
| 4,374,729 A * | 2/1983 | Frykhult | ............... | B01D 33/067 162/357 |
| 4,383,877 A * | 5/1983 | LaValley | ................ | B01D 33/06 156/155 |
| 4,707,260 A * | 11/1987 | Nagayama | ............. | B01D 33/04 100/118 |
| 4,869,823 A * | 9/1989 | Otani | .................... | B01D 33/067 210/349 |
| 5,520,808 A * | 5/1996 | Stoneburner | ........ | B01D 33/073 210/380.1 |
| 6,231,764 B1 * | 5/2001 | Wilkins | ............... | B01D 29/114 210/297 |
| 6,579,458 B2 * | 6/2003 | Mickelat | .................. | D21D 5/16 210/232 |
| 6,811,345 B2 * | 11/2004 | Jackson | .................... | F16B 5/02 403/122 |
| 2008/0145184 A1 * | 6/2008 | Levin | ........................ | F16B 5/02 411/426 |
| 2009/0297261 A1 * | 12/2009 | Mons | ...................... | F16B 19/02 403/337 |
| 2012/0201999 A1 * | 8/2012 | Woods | ................... | F16B 4/004 428/99 |

* cited by examiner

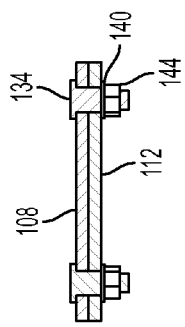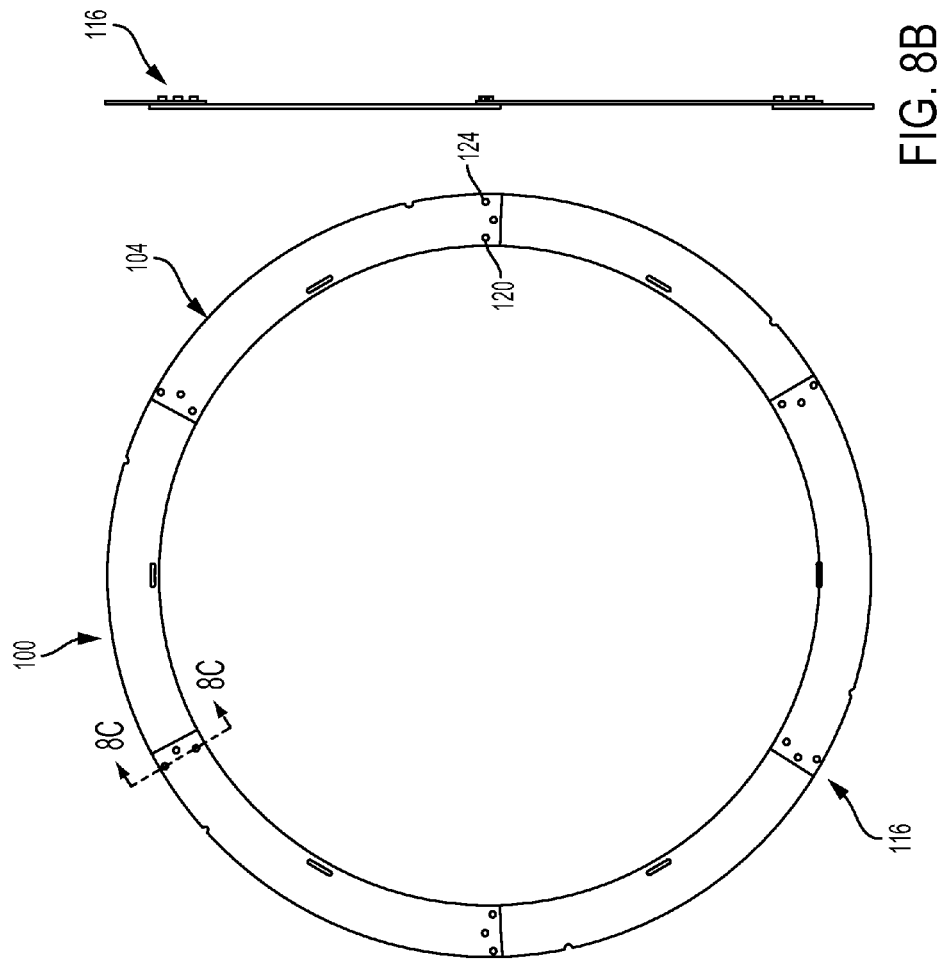

PINNED FLY RING FOR ROTARY DRUM WASHER AND METHOD OF MANUFACTURE

CROSS-REFERENCE TO RELATED APPLICATION

This application claims the benefit of U.S. Provisional Application No. 62/040,788, filed Aug. 22, 2014.

BACKGROUND

The present invention relates to rotary drum filtering apparatus and more particularly to the drum structure of rotary drum filtering apparatus such as, for example, rotary drum filters, thickeners, washers and the like of the type employed for filtering a slurry such as pulp stock.

Conventionally, rotary drum filtering apparatus of this general type have included a drum structure that supports a circumferential filter medium and contains filtrate compartments communicating with the openings in the filter medium for receiving liquid drained through the latter.

A rotary drum filtering apparatus, such as a rotary drum washer 10, is illustrated in FIG. 1. The traditional vacuum drum washer 10 includes a tank 14 having a baffled net box 18 and an net lip 22. Pulp entering the drum washer 10 passes over the lip 22 into an area 26 around a central drum 30. The central drum 30 is comprised of a plurality of fly rings 34 held together spaced apart, the outer circumference of the drum supporting washer decking 38. Pulp accumulates on the decking 38 and then is removed from the decking by a takeoff 42. The takeoff 42 deposits the pulp into an area 46 where a repulper 50 transports the pulp for further processing.

The fly ring is an integral part of the rotary washer drum's structure. It is located on the inside of the drum and its purpose is to maintain the round cross-section required to resist the loading seen by the drum while in operation.

The manufacturing process to make a fly ring 34 has been stagnating for decades. The traditional rotary drum washer fly ring manufacturing methods involve laser cutting, welding, machining, and straightening. Although laser cutting is used, the laser cutting, together with further processing, has not produced fly ring with an outer circumference within needed tight tolerances.

This prior fly ring construction illustrated in FIGS. 2 and 3 consisted of 5 laser cut segments that were assembled by grinding a weld preparation on each end of each ring segment, welding the ring segment ends together, grinding the weld, and then straightening the ring. The fly ring would then be machined to the proper finished outside diameter. This process is extremely labor intensive.

More particularly, the manufacturing of this ring involves the following steps: 1. Cut sections of the ring out of raw plate. 2. Produce weld preparations of both sides of the ring sections. 3. Position/Fixture the plates. 4. Weld each joint on one side. 5. Grind weld flat. 6. Flip over ring. 7. Weld each joint on opposite side. 8. Grind weld flat. 9. Straighten ring. 10. Machine outside diameter to finished dimension.

SUMMARY

The new manufacturing method of this disclosure takes advantage of the accuracy of an improved method of laser cutting and eliminates welding, machining, and straightening while maintaining very tight tolerances. The new method also uses a specially designed custom fastener that secures the fly ring segments together to form a precise ring. Elimination of the weld allows the fly ring to be assembled by a non-skilled tradesperson in a fraction of the time.

More particularly, disclosed is a fly ring adapted to be used in a rotary drum filtering apparatus, and a method of forming such a fly ring. The fly ring comprises a plurality of ring segments, each ring segment being laser cut. Each ring segment has a first end which overlaps a second end of an adjacent ring segment, forming a lapped joint. Each ring segment first and second end has at least two spaced apart through holes, the through holes of the first end being aligned with the through holes of the second end. A custom fastener extends through the first end and second end aligned through holes.

BRIEF DESCRIPTION OF THE DRAWINGS

FIG. 8A is an enlarged view of a pinned fly ring according to this disclosure.
FIG. 8B is a side view of the ring shown in FIG. 8A.
FIG. 8C is a cross-section of the overlapping joint of the ring segments shown in FIG. 8A.

Figure 1:
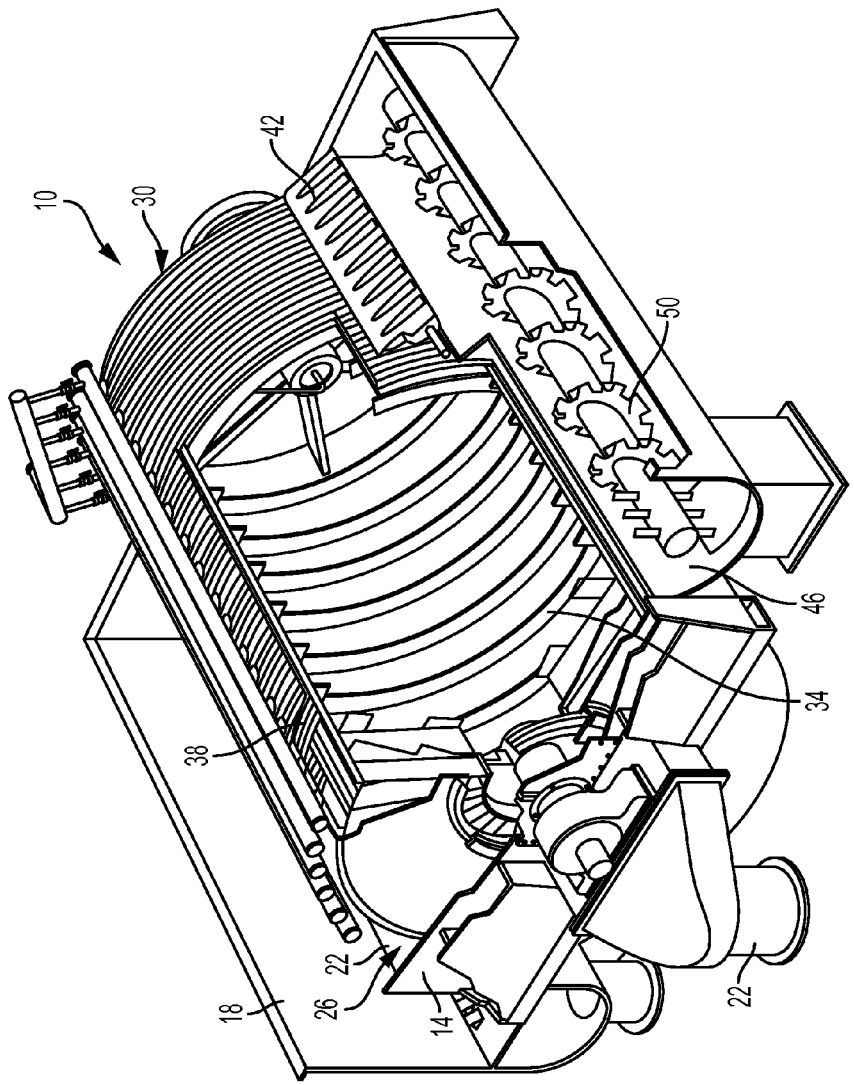
FIG. 1 is a perspective vewer of a pulp vacuum washer.
Figure 2:
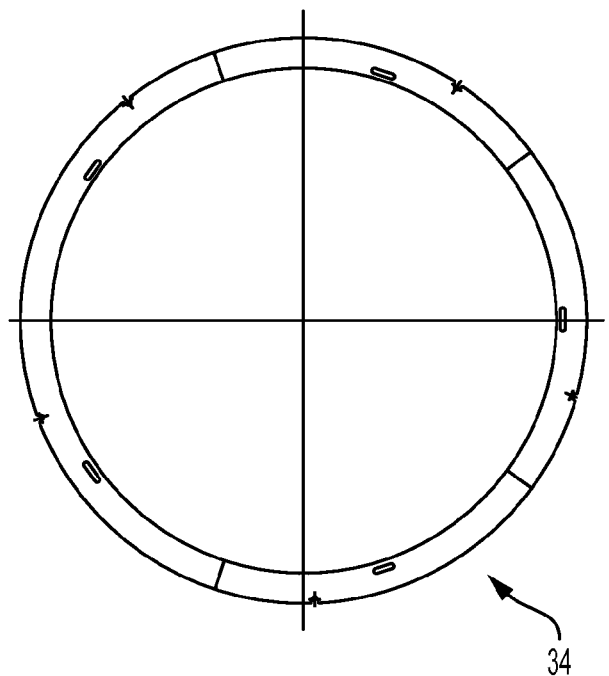
FIG. 2 is a top view of a prior art concentric ring.
Figure 3:
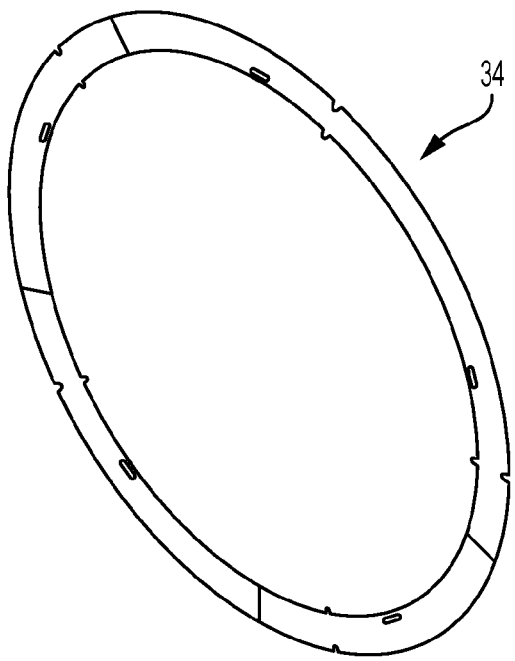
FIG. 3 is a perspective view of the ring shown in FIG. 2.
Figure 4:
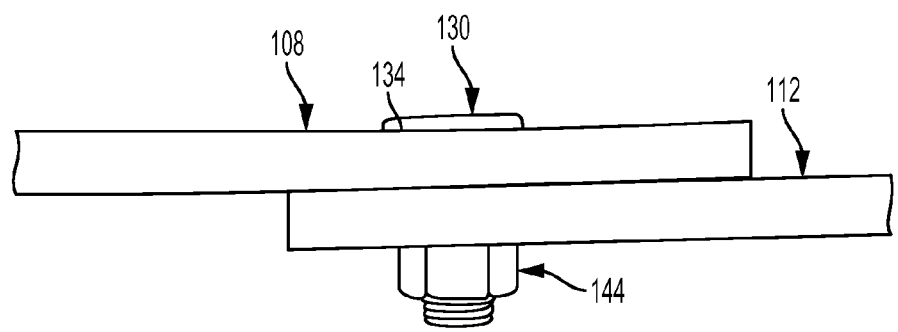
FIG. 4 is a side view of an overlapping joint of a fly ring according to this disclosure.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DESCRIPTION OF THE EMBODIMENT

Illustrated in the FIGS. 4 through 8 of the drawings is a fly ring 100 adapted to be used in a rotary drum washer, such as the one illustrated in FIG. 1, the fly ring 100 comprising a plurality of ring segments 104. In the disclosed fly ring 100, each ring segment 104 is identical to each other, but in other embodiments (not shown), each ring segment length can be different. Each ring segment 104 is laser cut, and, as illustrated in FIGS. 4, 5, 6 and 8B, has a first end 108 which overlaps a second end 112 of an adjacent ring segment, forming a lapped joint 116. As illustrated in FIGS. 8A, 8B and 8C, each ring segment first and second end has at least two spaced apart through holes 120 and 124, the through holes of the first end being aligned with the through holes of the second end. A custom fastener 130 extends through the first end and second end aligned through holes. The custom fastener 130 comprises a bolt with a head 134 on one side of the lapped joint 116, and a washer 140 and a nut 144 on the other side of the lapped joint 116.

Also disclosed is a method of forming the fly ring 100 for a rotary drum washer. The method comprises the following steps. First, laser cutting the plurality of arc shaped ring segments 104 out of a metal plate, each ring segment 104 having an outer circumference dimension within a predetermined tight tolerance. At least two through holes 120 and 124 are also laser cut into each end of each segment 104.

The ends of the ring segments 104 are then overlapped so that the assembled ring segments form a complete fly ring 100. Because of the tight tolerance cut dimension of the outer arc of each ring segment 104, the ring 100 has a predetermined outer circumference within a given tight tolerance.

Figure 5:
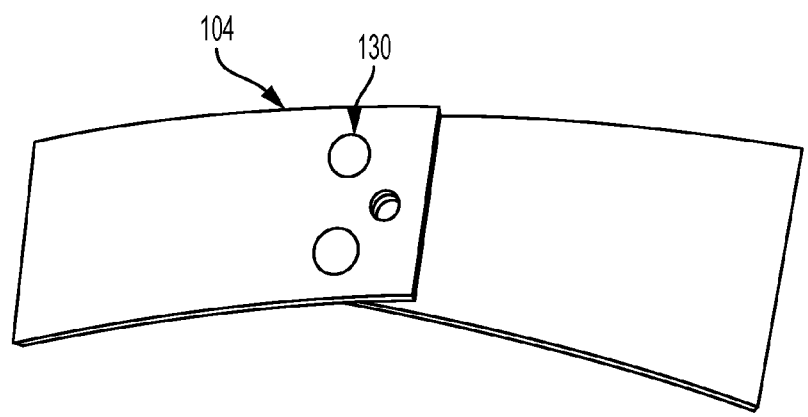
FIG. 5 is a top view of the joint of FIG. 4.
Figure 6:
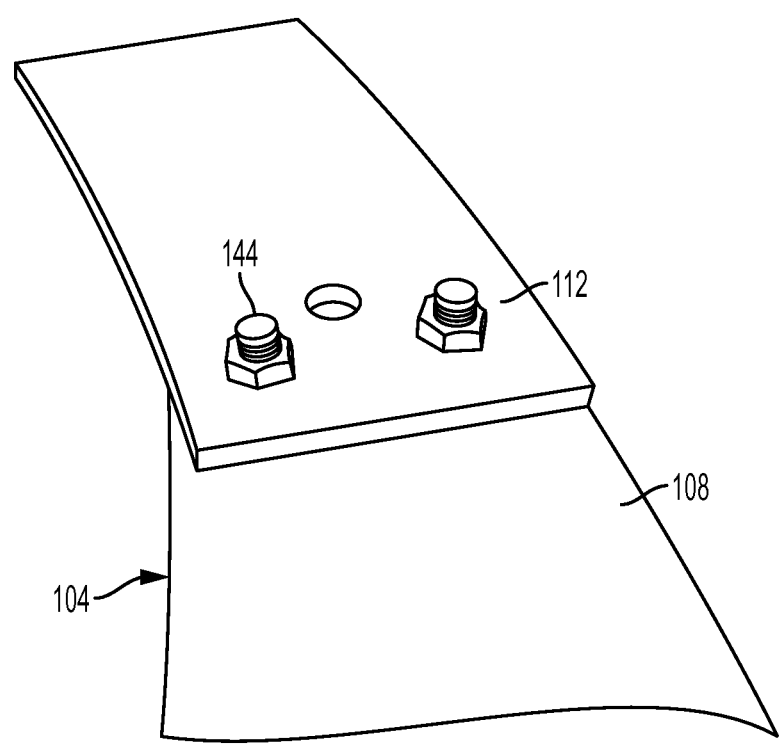
FIG. 6 is a bottom view of the overlapping joint of FIG. 4.

After overlapping one ring segment end over another ring segment end, the custom fastener 130 is driven through each of the at least two through holes in each end of each ring segment. The custom fastener 130 is then secured in each hole by placing the washer 140 and threading the nut 144 onto the end of the fastener 130, so that the assembled segments form the ring 100. As can be seen in FIGS. 5 and 6, the alignment of the edges of the inner circumference of the ring segments is not crucial, but the alignment of the outer circumference of the ring segments is.

Figure 7A:
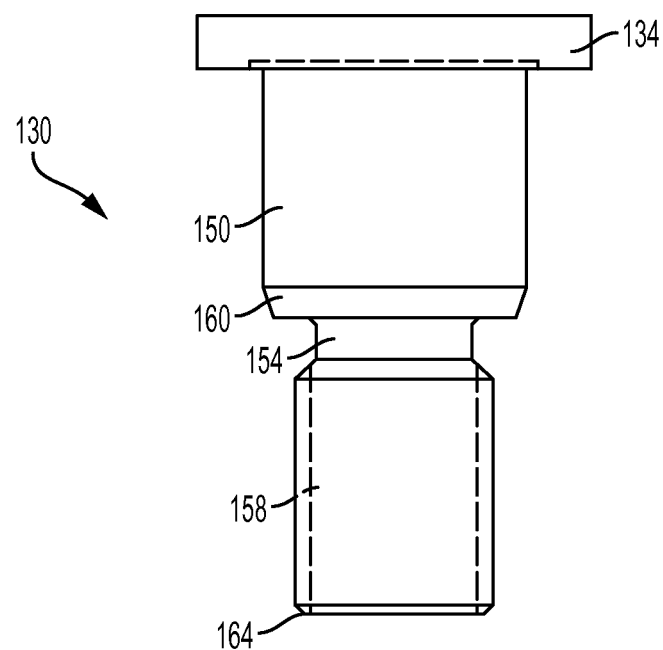
FIG. 7A is a side view of a custom fastener used to connect the two ring segments.
Figure 7B:
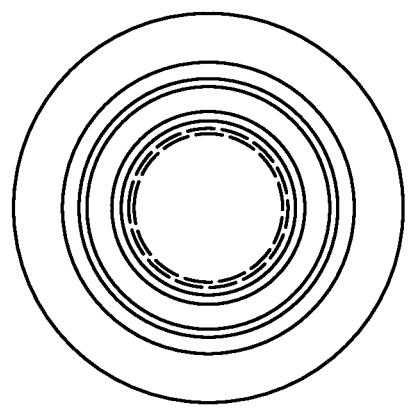
FIG. 7B is an end view of the custom fastener shown in FIG. 7A.

As illustrated in FIGS. 7A and 7B, the custom fastener 130 comprises a bolt having the head 134. The custom fastener 130 also includes a first diameter portion 150 adjacent the head 134 and with a first diameter, and a neck portion 154 adjacent the first diameter portion 150 with a smaller diameter than the first diameter. The custom fastener 130 also includes a third threaded diameter portion 158 adjacent the neck portion 154, the third diameter portion 158 having a third diameter greater than the neck portion diameter and less than the first diameter.

The end of the first diameter portion adjacent the neck portion has a first lead in chamfer 160, and the end of the custom fastener opposite the head end has a lead in chamfer 164. Each of these lead in chamfers aid in securing the ring segments together by accommodating and realigning any misalignment In the through holes in the end of the rings segments.

Benefits

Conventional cutting of ring segments by laser cutting faded to produce rings with the precise dimensions needed to accurately form a functional drum. The disclosed process modifies conventional laser cutting to improve its precision so that the laser cut segments can be used to form a properly dimensioned drum. More particularly, in the disclosed process, the laser cutting is speed optimized to obtain the desired tolerance and finish. The speed will vary depending on the material and power of the laser. This improved laser cutting permits the precision needed to accurately cut the ring segments. The ring segments can then be joined at a lap joint to form the precise shape needed for the drum.

This pinned fly ring takes advantage of this high precision laser cutting process and eliminates the need for welding, straightening, and machining while not compromising structural integrity. The new design comprises laser cut ring segments and custom designed fasteners. Unlike the traditional fly ring, the joints are lap joints with pre-laser cut holes.

After the ring segments are cut using the improved laser cutting, the joints between the ring segments are overlapped. The holes cut by laser cutting are then aligned. A custom faster is then used to secure the lapped segment ends to one another. The custom fastener includes a chamfered portion which forces the aligned openings to orient themselves so the precise drum outer circumference can be achieved.

The custom fastener is used to maintain the tight tolerance required between the hole and the shank of the bolt. Typical purchased fasteners do not have the high tolerance required to get the proper fit.

The neck portion between the fastener head and the threaded shank is a thread run-out groove. Because it is impossible to thread completely to a shoulder, the groove provides a means to end the thread and still tighten the nut completely.

The custom designed fasteners are driven into place and secured by a nut.

The assembly process comprises three easy steps. 1. Position the rings. 2. Drive the custom fasteners through the holes. 3. Fasten with a nut.

The new assembly process can be completed in a fraction of the time and does not require special skill (such as welding) to complete.

Various other features of this disclosure are set forth in the following claims.

The invention claimed is:

1. A method of manufacturing a fly ring for a rotary drum filtering apparatus, the method comprising the steps of: laser cutting a plurality of arc shaped ring segments out of a metal plate, each ring segment having an outer circumference dimension within a predetermined tight tolerance, and at least two through holes in each end of each segment, overlapping the ends of the ring segments so that all of the assembled segments form a complete ring, the ring having a predetermined outer circumference within a given tight tolerance, passing a custom fastener through each of the at least two through holes in each end of each ring segment and securing each fastener in each hole, so that the assembled segments form the ring.

2. The method of manufacturing a fly ring according to claim 1 wherein the custom fastener comprises a bolt with a head on one side of the lapped joint, and a washer and a nut on the other side of the lapped joint.

3. The method of manufacturing a fly ring according to claim 1 wherein the custom fastener has a lead in chamfer to further force alignment of the through holes.

4. The method of manufacturing a fly ring according to claim 1 wherein the custom fastener comprises a bolt having a head, a first diameter portion adjacent the head and with a first diameter, a neck portion adjacent the first diameter portion with a smaller diameter than the first diameter, and a third threaded diameter portion adjacent the neck portion, the third diameter portion having a third diameter greater than the neck portion diameter and less than the first diameter.

5. The method of manufacturing a fly ring according to claim 4 wherein the end of the first diameter portion adjacent the neck portion has a lead in chamfer, and wherein the end of the custom fastener opposite the head end has a lead in chamfer.

6. The method of manufacturing a fly ring according to claim 1 wherein the at least two through holes in each end of each segment are formed by, after the ring segments are cut by laser cutting, and the ends of the ring segments are overlapped, the holes are cut by laser cutting.

\* \* \* \* \*